# 3,286,131
CAPACITOR-OPERATED SCR LINE FAULT DETECTOR

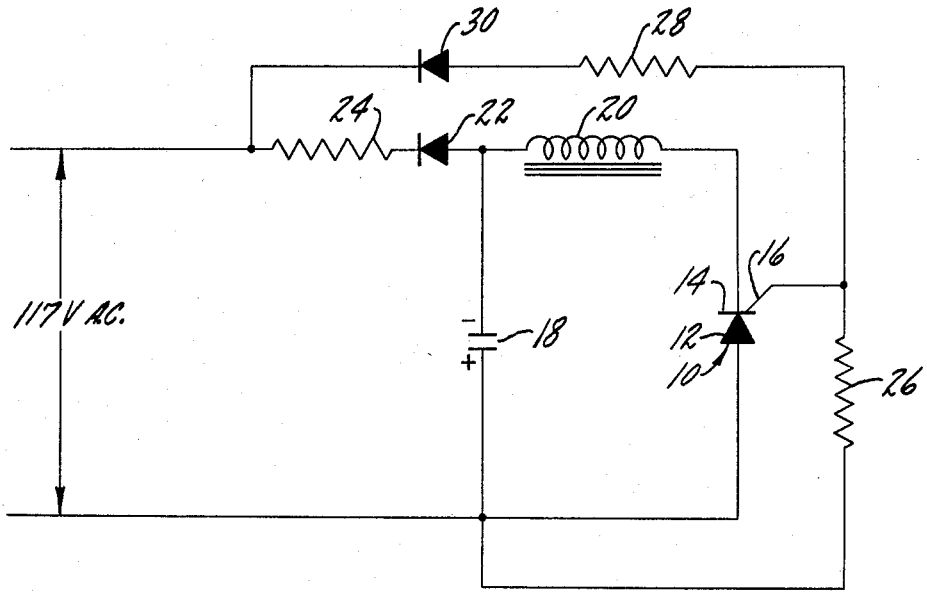

Thomas E. Myers, St. Charles, Ill., assignor to Ideal Industries, Inc., Sycamore, Ill., a corporation of Delaware
Filed July 13, 1964, Ser. No. 382,053
6 Claims. (Cl. 317—33)

This invention relates to a circuit for use in detecting power interruption or line faults.

A primary purpose of the invention is a circuit of the type described which is simple in nature and reliably operable.

Another purpose is a line fault detector circuit utilizing a gated rectifier, normally biased below cutoff, which is placed in an operating condition when there is an interruption in a power supply.

Another purpose is a line fault detector of the type described utilizing a capacitor discharge to provide a positive cut-off.

Another purpose is a line fault detecor which is automatically resetting.

Other purposes will appear in the ensuing specification, drawing and claims.

The invention is illustrated diagrammatically in the attached circuit diagram illustrating one form of line fault detector.

A silicon controlled rectifier or other satisfactory gated rectifier 10 may have an anode 12, a cathode 14 and a gate 16. The anode 12 may be connected to one side of a suitable source of power, which as shown herein may be a 117-volt A.C. power source. The anode 12 is also connected to a capacitor 18 which in turn is connected through a coil 20 to the cathode 14 of the SCR 10. The coil 20 may represent the operating coil of any type of control element, for example a relay, which may be a latching relay, holding relay, or any other type of relay. What is important is that the control element be operated by the coil 20. The capacitor 18 is also connected through a diode 22 and a current limiting resistor 24 to the opposite side of the power source or line.

The SCR 10, in normal operation, is biased below cutoff. This is accomplished by a resistor 28 connected through a diode 30 to the line side of resistor 24. A resistor 26 connected between the gate 16 and the other side of the line is the bias "on" resistor. Normally that side of the line or power source connected to the anode 12 will be the ground side of the line.

The use, operation and function of the invention are as follows:

When the power source is fully operational or when the line is transmitting power, and assuming that that side of the line connected to the anode of the SCR is grounded, the capacitor 18 will charge in the polarity indicated to the value of peak line voltage. Diode 22 in cooperation with resistor 24 will permit the capacitor to charge in the polarity indicated. Resistor 28 and diode 30 will provide a negative voltage on the gate 16 of the SCR 10 sufficient to maintain the SCR in a cutoff condition. It is advantageous to suply the bias cut-off from the line through a separate diode rather than through the diode utilized in the capacitor charging circuit to isolate the bias from the influence of the charged capacitor. Any interruption in the power source or any line failure causing a large drop in line voltage will remove the bias from the gate 16 and permit the charged capacitor to discharge through coil 20 and rectifier 10. When there is a drop in voltage or power interruption the gate 16 and anode 12 of the SCR become positive because of the charged capacitor, the SCR then conducts, permitting the capacitor to discharge.

The capacitor 18 will discharge through a series circuit made up of the coil 20 and the anode and cathode of the rectifier 10. Because the capacitor is discharged through a coil there will be damped oscillations with the result that the first negative peak of these oscillations will cut off the rectifier. In other words, coil 20 will receive a positive peak of current which is sufficient to operate it. The succeeding negative half cycle will cut off the SCR 10. As a result, there will be no subsequent false firing or operation of the rectifier. When line service is reestablished, the negative bias from diode 30 and resistance 28 will act to hold gated rectifier 10 in its cut-off state, and capacitor 18 will charge as before. Thus the circuit is automatically reset in a condition to again detect any subsequent line fault.

The coil 20 may represent the coil of any type of operating element, for example a relay or the like. The invention should not be limited to any particular control or operating element. The coil 20 may be utilized to switch on standby or auxiliary power equipment, in the event of line failure, or to make any other type of switching operation. In addition, the circuit can be used to indicate the number of faults on a line during a particular period.

Although a gated semiconductor rectifier is advantageous, other types of gated rectifiers may be used.

The terminology "power source" or "power line" is meant to include any power supply, either A.C. or D.C. operating at any voltage.

Whereas the preferred form of the invention has been shown and described herein, it should be realized that there are many modifications, substitutions and alterations thereto within the scope of the following claims.

What is claimed is:

1. In a circuit for use in detecting power interruption, a source of electric power, a rectifier having an anode, cathode and gate, a control element having an operating coil, a capacitor in series with said coil, anode and cathode, said capacitor being connected to said power source in a manner to be charged thereby during normal operation, and biasing means connected to said gate and power source to normally maintain said rectifier in a cut-off condition including a resistor connected between said gate and one side of said power source and a second resistor connected between said gate and the other side of said power source, an interruption in power removing the bias and permitting said capacitor to discharge through said rectifier and coil to operate said control element.

2. The circuit of claim 1 further characterized by and including a diode and a resistance connected between said capacitor and said power source.

3. The circuit of claim 2 further characterized in that said capacitor is connected to said power source to be charged in a manner such that the charged positive side of the capacitor is connected to the anode of said rectifier.

4. The circuit of calim 1 further characterized by and including a diode connected between said first-named resistor and said one side of the power source.

5. In a circuit for use in detecting A.C. power interruption, a source of A.C. power, a silicon controlled rectifier having an anode, cathode and gate, a control element having an operating coil, a capacitor in series with said coil, anode and cathode, one side of said capacitor being connected to one side of said A.C. source, a diode and a resistance connected between the other side of said capacitor and the other side of said A.C. source whereby said capacitor is charged, during normal operation, with the positive side thereof connected to the anode, and means connected to said gate and power source for biasing said rectifier to a cutoff condition during normal operation of said power source including a resistance connected to said gate and to said one side of the source, a second resistance and a diode connected between said gate and the other side of said source, an interruption in power removing said bias and permitting said capacitor to discharge through said rectifier and coil to operate said control element.

6. The structure of claim 5 further characterized in that side of said power source connected to the anode of said rectifier is grounded.

References Cited by the Examiner

UNITED STATES PATENTS

| | | | |
|---|---|---|---|
| 2,848,659 | 8/1958 | Cutler. | |
| 3,158,786 | 11/1964 | Hurtle. | |
| 3,160,795 | 12/1964 | Aune | 307—88.5 |
| 3,187,225 | 6/1965 | Mayer | 317—33 |

FOREIGN PATENTS 362,738   6/1962   Switzerland.

MILTON O. HIRSHFIELD, Primary Examiner.

SAMUEL BERNSTEIN, Examiner.

R. V. LUPO, Assistant Examiner.